US007750513B2

United States Patent
Witte et al.

(10) Patent No.: US 7,750,513 B2
(45) Date of Patent: Jul. 6, 2010

(54) PRIMARY PART OF A LINEAR MOTOR AND LINEAR MOTOR THEREWITH

(75) Inventors: Werner Witte, Unna (DE); Carsten Bührer, Bonn (DE)

(73) Assignee: Zenergy Power GmbH, Rheinbach (DE)

( * ) Notice: Subject to any disclaimer, the term of this patent is extended or adjusted under 35 U.S.C. 154(b) by 79 days.

(21) Appl. No.: 12/094,714

(22) PCT Filed: Nov. 24, 2006

(86) PCT No.: PCT/EP2006/011293

§ 371 (c)(1),
(2), (4) Date: May 22, 2008

(87) PCT Pub. No.: WO2007/062782

PCT Pub. Date: Jun. 7, 2007

(65) Prior Publication Data

US 2008/0290740 A1    Nov. 27, 2008

(30) Foreign Application Priority Data

Nov. 30, 2005    (DE)    ...................... 10-2005-057-381

(51) Int. Cl.
*H02K 41/02* (2006.01)
*H02K 7/06* (2006.01)
*H02K 33/00* (2006.01)
*H02N 2/00* (2006.01)

(52) U.S. Cl. .............. 310/12.01; 310/12.24; 310/12.25; 310/12.26

(58) Field of Classification Search ... 310/12.24–12.26, 310/12.01
See application file for complete search history.

(56) References Cited

U.S. PATENT DOCUMENTS 3,911,706 A    10/1975    Davis
4,692,673 A    9/1987    Delong (Continued)

FOREIGN PATENT DOCUMENTS

DE    103 17 993 A1    11/2004

(Continued)

OTHER PUBLICATIONS

Machine Translation JP2003284314A (2003).*

(Continued)

*Primary Examiner*—Quyen Leung
*Assistant Examiner*—Jose A Gonzalez Quinones
(74) *Attorney, Agent, or Firm*—Fay Sharpe LLP

(57) ABSTRACT

The invention relates to a linear motor and in particular a primary part of the linear motor for the movement of a secondary part, with a plurality of coils for inducing a magnetic field transmitting force along an axis between the primary part and the secondary part and with teeth, which are made from a magnetizable material, are arranged between adjacent coils and have a base section remote from the axis and an end section facing the axis, the teeth on the end section being wider than on the base section. In order to provide a primary part or a linear motor which also allow for high force densities given a compact design, the coils also extend in the interspace between the end sections of adjacent teeth so as to increase the magnetic flux density.

36 Claims, 1 Drawing Sheet

U.S. PATENT DOCUMENTS

Figure 1:
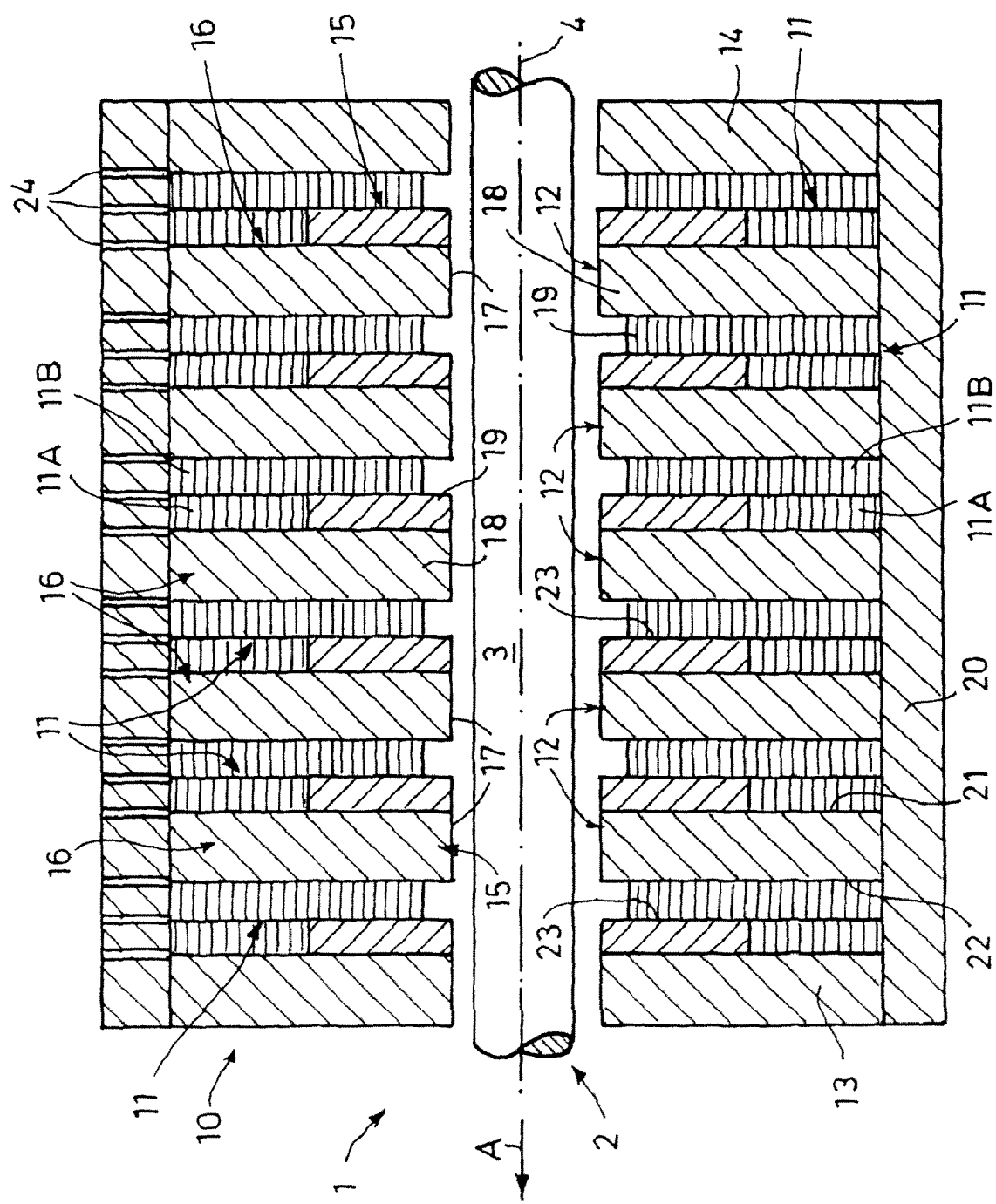

| | | |
|---|---|---|
| 6,275,039 B1 * | 8/2001 | Young et al. ................. 324/319 |
| 6,329,728 B1 | 12/2001 | Kitazawa et al. |
| 6,354,087 B1 * | 3/2002 | Nakahara et al. .................. 62/6 |
| 6,603,224 B1 * | 8/2003 | Hollingsworth et al. .. 310/12.02 |
| 2004/0263003 A1 | 12/2004 | Jack |
| 2005/0082934 A1 | 4/2005 | Kawai |
| 2005/0151428 A1 * | 7/2005 | Miyashita et al. ............. 310/12 |

FOREIGN PATENT DOCUMENTS

| | | | |
|---|---|---|---|
| JP | 2003284314 A | * | 10/2003 |
| WO | WO 01/48888 A2 | | 7/2001 |

OTHER PUBLICATIONS

International Search Report, PCT/EP2006/011293, Feb. 26, 2007.
International Preliminary Report on Patentability and Written Opinion, Jun. 11, 2008, Trithor GMBH.
International Preliminary Report and Written Opinion, Jul. 8, 2008.

* cited by examiner

PRIMARY PART OF A LINEAR MOTOR AND LINEAR MOTOR THEREWITH

CROSS-REFERENCE TO RELATED APPLICATIONS

This application is a national stage entry of international application number PCT/EP2006/011293, having international filing date Nov. 24, 2006, which was not published in English, which claims priority to German patent application number DE102005057381.9, filed Nov. 30, 2005, the entirety of which are hereby incorporated by reference.

FIELD OF THE INVENTION

The invention relates to a primary part of a linear motor for a secondary part which is capable of moving linearly relative to the primary part, with a plurality of coils for inducing a magnetic field transmitting force along an axis between the primary part and the secondary part and with teeth, which are made from a magnetizable material, are arranged between adjacent coils and have a base section remote from the axis and an end section facing the axis, the teeth on the end section being wider than on the base section. The invention furthermore also relates to a linear motor with such a primary part.

BACKGROUND

A linear motor with a primary part and a secondary part which is capable of being displaced relative thereto is known from DE 42 17 357 A1. The primary part has coils which have a polyphase alternating current applied to them so as to induce the magnetic field extending along a movement axis of the secondary part. In this case, the primary part forms a stator and the secondary part forms a moveable rotor. Soft-magnetic teeth, which focus lines of force of the magnetic field and intensify the magnetic field induced by the coils, are arranged between the coils.

In the case of electric motors with a primary part inducing a magnetic field, it is known that the magnetizability of the stator material used is restricted by the material properties, i.e. the saturation magnetization. When using high current densities in the turns of the primary part, saturation occurs, i.e. a greater magnetomotive force cannot be achieved. The magnetic flux density is generally defined as the flux of the increased magnetic field through an area.

The generic U.S. Pat. No. 3,911,706 discloses a linear motor with a stator, which comprises soft-magnetic stator sleeves and stator annular disks alternately stacked one on top of the other. Coils are arranged between the stator annular disks. The stator sleeves, the stator annular disks and the coils are arranged concentrically with respect to a receptacle for a rotor. In an embodiment disclosed in U.S. Pat. No. 3,911,706, tooth tip pieces made from a material with a relatively high magnetizability and in the form of a T in cross section are arranged on the inner circumference of the stator annular disks, directly adjacent to the receptacle. In each case insulating or reinforcing rings are arranged between the sections of the T-shaped tooth tip pieces which protrude laterally over the stator annular disks, and the coils extend in the radial direction as far as the tooth tip pieces or the insulating rings which protrude laterally over the stator annular disks.

DE 2 336 893 discloses a primary part comprising an iron core with iron laminates as teeth. The teeth are separated from one another by means of slots, which are wider at a distance from the tooth tips than in the region of the tooth tips. Windings or coils are accommodated in the wider slot sections further removed from the receptacle, while the narrower slots arranged closer to the receptacle are filled by means of filling elements for reinforcing the primary part. All of the remaining regions after the introduction of the filling elements are cast with a pourable filling compound which is borne by the filling elements.

The linear motors which are available at present on the market can be used as actuating and positioning elements and in this case achieve surface force densities of up to 8 N/cm2.

SUMMARY

The object of the invention is to provide a primary part of a linear motor or a linear motor which make high force densities possible given a compact design, with the result that the linear motors can possibly also replace hydraulic drives.

This object is achieved according to the invention by virtue of the fact that the coils extend not only between the base sections but also in the interspace between the wider end sections of adjacent teeth so as to increase the magnetic flux density.

As a result of the end sections which are wider than the base section, the quantity of magnetizable or soft magnetic material in the end section of the teeth and therefore in the region facing the secondary part is increased, with the result that higher current densities in the coils result in increased magnetization and therefore in a higher magnetic flux in the end section of the teeth. The local widening of the end sections means that the magnetization in the teeth only achieves saturation there in the case of very high current densities. As a result of the change in shape of the teeth, it is possible to prevent the greatest magnetic flux from occurring as early as at, for example, half the tooth height and then dropping off towards the secondary part. The increase in the magnetic field is achieved in particular in the vicinity of the axis or in the vicinity of the secondary part. As a result of the high current densities which can be achieved with superconducting coils, high force densities can be produced along the secondary part. The wider end sections adjoining the receptacle region provide more magnetizable material than in the base section in order to deflect the magnetic flux toward the receptacle region. The magnetic field which is induced by the coil turns which are arranged at the height of the base sections magnetizes the teeth both in the base section and in the end section. The magnetic field of these turns together with the magnetization of the teeth forms part of the magnetic field in the receptacle region. The coil turns which preferably almost reach up to the receptacle region and are arranged in the interspace between the widened end sections of the teeth serve the purpose of additionally increasing the magnetic field in the receptacle region and also increase the magnetization in the end sections. As a result of the fact that the coils extend next to the end sections almost as far as the receptacle region, specific influencing or control of the magnetic flux in the region of the wider end sections close to the receptacle and consequently high forces along a secondary part arranged in the receptacle region can be produced.

In accordance with an advantageous configuration, the width of the teeth in the base section can be constant or substantially constant. The end section can take up approximately or precisely half the tooth height in the radial direction. Given a simple design in terms of manufacturing, the tooth sides in the end section and/or in the base section are planar. Sections of the mutually opposite tooth sides of adjacent teeth can then extend parallel to one another. The base section of the teeth can preferably merge with the end section, with at least one step at one of the two tooth sides facing the coils. The other tooth side of the teeth can be configured so as to be flat, without a step or the like.

In accordance with a particularly advantageous configuration, the teeth have a multi part design. Multi-part teeth can be provided with a widened portion in a particularly simple manner in terms of manufacturing. The teeth can in particular have a two part design. In a preferred configuration, a tooth part then forms the base section and a subsection of the end section, the widening in the end section being achieved by means of a ring arranged laterally on the tooth part. The tooth part then expediently extends over the entire tooth height. The tooth part and the ring can each have a constant thickness. Alternatively, the ring can taper toward the ring circumference or can be beveled at the ring circumference. The ring made from magnetizable material could also be provided with a conical bevel in the end section. In another two-part configuration of the teeth, the end section can be formed by a wide tooth part, while the base section can then be formed by a narrower tooth part arranged on the outer circumference of the wider tooth part. All of the tooth parts can be produced in particular in iron from insulated, stacked laminates or from powder metallurgically produced material with or without binders so as to reduce eddy current losses.

The primary part preferably has a receptacle, which is formed along the axis by the coils and the teeth, for the secondary part. The primary part can engage partially around the axis. Preferably, the primary part engages around the axis completely, however, and thus forms a radially closed, in particular concentric receptacle arranged around the axis for the secondary part. The teeth can in particular be in the form of rings or comprise ring segments or slotted rings. The teeth are preferably provided with slots so as to reduce eddy current losses.

The coils are also preferably in the form of rings. In a particularly preferred configuration, the coils are arranged coaxially with respect to the axis and/or are aligned parallel to one another. Expediently, they are in the form of pancake coils. These pancake coils, which are possibly also in the form of double-disk coils, are further preferably cast into a casting compound, for example plastic, in order to fix the winding and to be able to manipulate the coils better. Preferably two or more coils or coil stacks are arranged between adjacent teeth. As a result, the coils can bear against the teeth and in particular substantially fill interspaces between adjacent teeth in order to be able to be supported on the teeth in the axial direction. The teeth extend in the radial direction expediently from a coil circumference beyond an inner turn of the coils, as a result of which the teeth extend further with respect to the axis than the coils. The receptacle can thus be delimited by the end sides of the teeth. A first coil preferably bears against the base section of the tooth and a second coil further preferably bears against the first coil and against the end section. Expediently, the second coil bears against the tooth side of the adjacent tooth in planar fashion.

The coils extend both between the base sections and between the end sections of adjacent teeth. The coils are preferably arranged between adjacent teeth in such a way that they bear against the end sections and the base sections or lie opposite the latter and adjacent to them. The coils or coil stacks extend in the radial direction in each case preferably completely along the base sections and at least along part or a subsection of the end sections. The coils preferably fill the interspaces between the base sections completely and between the end sections almost completely. It is particularly advantageous if the coils are matched to the gap geometry between the teeth. In this case, either single-part correspondingly matched coils or coil stacks can be inserted into the gaps or the gaps or interspaces between the end and base sections of the teeth are filled with a plurality of coils, preferably in the form of rings. The coils or coil stacks can be supported in the axial direction directly or indirectly on the teeth. In order for them to bear or be supported indirectly, the coils can be arranged so as to be spaced apart from the teeth by means of spacers in order to form cooling gaps for a coolant between the teeth and the coils. The spacers can in this case preferably be fixed to the coils.

An alternative arrangement of the coils can be achieved with a wide coil and a narrow coil. The wide coil expediently bears against the base section of adjacent teeth, and the narrow coil expediently bears against the end section of both teeth. The teeth and the coils can, irrespective of the arrangement of the coils, be surrounded by a yoke in the form of a magnetic return path, which delimits the gap between the coils. The teeth can either be formed in one piece by slots in the yoke or be formed by rings or annular disks on the yoke. The teeth and/or the yoke expediently have a soft magnetic material, which preferably contains a CoFe alloy or FeSi alloy and/or can be laminated and/or can be in the form of a powder composite material and/or in the form of a powder sintering material. Each of the coils can have at least one winding which is wound from a conductor and which can be operated with a current density of preferably more than 10 A/mm2. For this purpose, the conductor from which the winding is manufactured can be manufactured from aluminum or copper, in this case the coils preferably being water cooled. Alternatively, the conductor can be manufactured from a superconductor, preferably a high temperature superconductor, in order to achieve high current densities in the conductor. As a result of the tooth shape according to the invention and the high current densities which can be achieved in particular in the case of superconductors, the primary part is also suitable for use of the linear motor as a servodrive or as a lifting drive, for example in pressing installations.

Further advantages and configurations of the invention result from the description below of an exemplary embodiment illustrated in the drawing of a linear motor according to the invention and a primary part according to the invention. In the drawing, the single FIGURE shows schematically a longitudinal section through a linear motor with a primary part and a secondary part.

DETAILED DESCRIPTION

The FIGURE shows, in a highly schematic and simplified form, a linear motor 1 with a primary part 10, which in this case is cylindrical, and a cylindrical secondary part 2. The primary part 10 is provided with a receptacle 3 along a central axis 4. The secondary part 2 extends in the receptacle 3 along the axis 4. The primary part 10 which has been provided with coil stacks 11 and the secondary part 2 are arranged concentrically with respect to the axis 4. The secondary part 2 is capable of moving along the axis 4 through a magnetic field (not illustrated) induced by the coil stacks 11. In the case of the linear motor 1 illustrated, the primary part 10 in this case acts as a stator which is fixed in position and which moves the secondary part 2 as a rotor linearly or in the ejection direction A. Application areas for the linear motors according to the invention are, for example, compact lifting drives in pressing installations or insertion drives of injection-molding machines or the like, whose drives have until now comprised hydraulic systems in the prior art.

In the configuration shown, the primary part 10 has six coil stacks 11, which ring around the axis 4 and therefore the secondary part 2. The coil stacks 11 are arranged concentrically with respect to the axis 4. Each coil stack 11 comprises a first coil 11A and a second coil 11B, with both coils 11A, 11B having the same outer diameter, while the inner diameter of the coil 11A is markedly greater than that of the coil 11B. The coil 11A is narrow in the radial direction, while the coil 11B is markedly deeper. The narrower coil 11A bears laterally against the deeper coil 11B. The coils 11A, 11B which are in the form of rings and are only indicated schematically can expediently be in the form of pancake coils or double-disk coils. In order to induce magnetic fields which are as high as possible, the coils 11A, 11B are preferably wound densely from a highly conductive conductor. It is possible to use as the conductor aluminum, copper, a superconductor or preferably a high-temperature superconductor with which current densities of, for example, more than 10 A/mm2 can be achieved. As a result of these high current densities, strong magnetic fields can be induced by the coil stacks 11 in the receptacle 3, which coil stacks 11 are reinforced by magnetizable inner teeth 12 and outer teeth 13, 14. A coil stack 11 is arranged in each case between two adjacent teeth 12-13, 12-14 or 12-12, with the result that teeth 12, 13, 14 and coil stacks 11 alternate in the axial direction. While coil stacks 11 bear against the teeth 12 on both sides, in each case only one coil stack 11 bears against the two outer teeth 13, 14. The teeth 12, 13, 14 extend in each case from the coil circumference of the coils 11A, 11B as far as beyond an inner turn of the deeper coil 11B toward the axis 4. The teeth 12, 13, 14 have in each case one end section 15 facing the axis 4 and one base section 16 remote from the axis 4. In this case, the receptacle 3 is delimited by an end side 17 of the end section 15. The teeth 12, 13, 14 bear with the outer casing of the base section against a yoke 20, which is in the form of a casing and which acts as a magnetic return path.

According to the invention, the teeth 12, 13 on the end section 15 are wider than on the base section 16 so as to increase the magnetic flux density. The teeth 12, 13 are in this case formed in two parts and are formed by a tooth ring 18, which extends over the end section 15 and the base section 16, and a widening ring 19, which bears on one side against the tooth ring 18. In contrast to the coils 11A, 11B, the widening ring 19 only extends from the end side 17 in the radial direction as far as half the tooth height in order in each case to widen the tooth 12 and 13 in the end section 15 in comparison with the base section 16, as a result of which there is more magnetizable material between the coils 11B in the end section 15 of the teeth 12, 13 than between the coil stacks 11 in the base section 16. The teeth 12, 13 as a result increase the magnetic field induced by the coils 11A, 11B in the end section 15 as a result of magnetization to the greatest possible extent, without saturation of the magnetization in the teeth 12, 13 occurring as early as at half the tooth height.

The coil stacks 11 extend both between the base sections 16 and between the end sections 15 of adjacent teeth 12. The coils 11B of the coil stacks 11 extend in the radial direction adjacent to and along the base sections 16 of the teeth and along a large subsection of the end section 15 almost as far as the receptacle 3. The coil stack 11 formed by the two coils 11A, 11B is wider at the height of the base sections 16 than at the height of the end sections 15. The coils 11 fill the interspaces between the base sections 16 and the end sections 15 of adjacent teeth 12 almost completely and are matched to the gap geometry between the base and end sections 15, 16. The gap geometry substantially corresponds to the coil cross section, or vice versa. The coils 11B are arranged between adjacent teeth 12 in such a way that they extend in the radial direction approximately as far as the receptacle 3 for the secondary part 4, while the coils 11A in each case fill the interspace at the height of the base sections 16 between the inner circumferential face of the yoke 20 and the rear side, which is remote from the receptacle, of the end section 15, which widens the teeth 12. In the region of the base sections 16, the coils 11B in each case lie axially next to a coil 11A. The coil 11B fills the interspace at the height of the base section 16 between the coil 11A on one side and the planar tooth face of the base section 16 of the adjacent tooth 12 on the opposite side completely and extends further into the interspace between the widening ring 19 and the opposite, planar tooth face of the adjacent tooth 12. The coils 11B in this case overlap more than half of a side face of the end section 15 or almost the entire side face of the end section 15 or the widening ring 19 in the radial direction. The coil 11A has substantially the same width as the widening ring 19. The width of the coil 11B approximately or precisely corresponds to the width of the interspace between the adjacent end sections 15. The coil 11B is supported in the axial direction on one side on the planar tooth side and on the other side on the coil 11A and the widening ring 19. The coil 11A, when viewed in the radial direction, lies between the yoke 20 and the widening ring 19. As a result of the wide end section 15, the coil stack 11 can have a high current density without magnetic saturation of the magnetizable tooth material occurring in the soft-magnetic tooth material at the intermediate height of the current-conducting coils 11A, 11B, for example at half the tooth height. That part of the coil 11B which is parallel to the end section 15 induces an additional magnetic flux in the receptacle 3 and brings about additional magnetization in the end sections 15.

The coil 11A in the base section 16 bears laterally against the tooth side 21 of the tooth ring 18. On the outer circumference, the coils 11A bear against the yoke 20 and with their inner circumference they bear against the widening ring 19. The coil 11B bears partially laterally against the coil 11A and in addition laterally against the tooth side 23 of the widening ring 19. With its other side face it bears against the tooth side 22, which is flat over the entire tooth height, of the tooth ring 18 which partially forms the adjacent tooth. The coil stacks 11 almost completely fill the interspaces between the teeth 12, 13, 14. The width of the teeth 12, 13 is constant in the base section 16. A step is formed with the widening ring 19 on one of the two tooth sides 21, which face the coils 11A, 11B, of the tooth ring 18. The widening ring 19 widens the teeth 12, 13 in the end section. The teeth 12, 13 are in each case planar on the tooth side 22 opposite the widening ring 19 over the entire tooth height. The yoke 20 acts as a magnetic return path and the teeth 12, 13, 14 are used for focusing the magnetic flux. The magnetic field induced by the coil stacks 11 is increased by magnetization of the teeth 12. Since the current densities in the coil stacks 11 are very high, it is advantageous in accordance with the invention to additionally introduce magnetizable material in the end section 15 between the coils, as has occurred in this case in the form of the widening ring 19, with the result that the teeth are not magnetized as far as saturation as early as, for example, at half the tooth height. The teeth 12, 13 have the greatest magnetization at the receptacle 3 in the end section 15, in particular on the end sides 17 of the teeth 12, 13. As a result of the widening of the teeth 12, 13, the force densities which can be achieved in the receptacle 3 are high. In order to cool the coil stacks 11, preferably small cooling gaps (not illustrated here) are arranged between the coils 11A, 11B and the teeth 12, 13, 14, in which cooling gaps a coolant (not illustrated), such as water, nitrogen, helium or the like, can circulate so as to cool the coils 11A, 11B. In the vertically protruding part of the primary part 10, cooling channels 24 are arranged in the yoke 20, through which cooling channels the coolant can enter and be discharged.

Numerous modifications are apparent to a person skilled in the art from the description, and these modifications are intended to fall within the scope of protection of the appended claims. The linear motor can be in the form of a synchronous or asynchronous motor with a closed or open design. In the exemplary embodiment, a cylindrical primary and secondary part are described. The primary and secondary part could also be designed to be flat or only partially cylindrical. The secondary part could be provided with permanent magnets or electromagnets arranged axially in series. Alternatively, the secondary part could also be in the form of a magnetizable metal bar or a metal bar which is magnetized by induced currents in the form of a rod or tube, which is pushed and/or drawn through a drawing ring with the magnetic field of the primary part. In an alternative arrangement, the coils can also overlap one another radially. The teeth or at least tooth parts could also be formed in one piece on the yoke. In addition to the use of multi-part coil stacks, for example comprising two or three coils, it is also conceivable to use one coil which is matched to the gap geometry between the teeth.

The invention claimed is:

1. A primary part of a linear motor for moving a secondary part relative to the primary part, with a plurality of coils for inducing a magnetic field transmitting force along an axis between the primary part and the secondary part and with teeth, which are made from a magnetizable material, are arranged between adjacent coils and have a base section remote from the axis and an end section facing the axis, the teeth on the end section being wider than on the base section, wherein the coils extend in the interspace between the end sections of adjacent teeth so as to increase the magnetic flux density, wherein the teeth have a multi part design, and wherein a tooth part forms the base section and a subsection of the end section and, in order to widen the end section, a ring is arranged laterally on the tooth part.

2. The primary part as claimed in claim 1, wherein the width of the teeth in the base section is constant or substantially constant.

3. The primary part as claimed in claim 1, wherein the end section takes up half the tooth height in the radial direction.

4. The primary part as claimed in claim 1, wherein sections of opposite tooth sides of a tooth in the end section and/or in the base section are planar and extend parallel to one another.

5. The primary part as claimed in claim 1, comprising a step with which the base section merges into the end section at one of the two tooth sides facing the coils.

6. The primary part as claimed in claim 5, wherein the other tooth side is planar.

7. The primary part as claimed in claim 1, wherein the tooth part and the ring part have a constant width.

8. The primary part as claimed in claim 1, wherein the ring tapers towards the ring circumference or is configured so as to be conically beveled.

9. The primary part as claimed in claim 1, comprising a receptacle formed along the axis by the coils and/or the teeth for the secondary part.

10. The primary part as claimed in claim 1, wherein the coils are manufactured in the form of rings and preferably in the form of pancake coils and/or the coils are arranged concentrically with respect to the axis.

11. The primary part as claimed in claim 1, wherein at least two coils or a coil stack are arranged between adjacent teeth.

12. The primary part as claimed in claim 1, wherein the coils bear against the teeth and in particular substantially fill interspaces between adjacent teeth.

13. The primary part as claimed in claim 1, wherein the end sections of the teeth extend in the radial direction with respect to the axis beyond an inner turn of the coils.

14. A primary part of a linear motor for moving a secondary part relative to the primary part, with a plurality of coils for inducing a magnetic field transmitting force along an axis between the primary part and the secondary part and with teeth, which are made from a magnetizable material, are arranged between adjacent coils and have a base section remote from the axis and an end section facing the axis, the teeth on the end section being wider than on the base section, wherein the coils extend in the interspace between the end sections of adjacent teeth so as to increase the magnetic flux density, and wherein a first coil bears laterally against the base section, and a second coil bears laterally against the first coil and laterally against the end section.

15. The primary part as claimed in claim 1, wherein individual coils or coil stacks which are matched to the gap geometry are arranged between adjacent teeth.

16. The primary part as claimed in claim 1, wherein the teeth and/or a yoke, which forms a magnetic return path, have a soft-magnetic material, which contains a CoFe alloy and/or is in the form of a powder sintering material.

17. The primary part as claimed in claim 1, wherein the coils have at least one winding which is wound from a conductor and which can be operated with a current density of more than 10 A/mm$^2$.

18. The primary part as claimed in claim 17, wherein the conductor is manufactured from aluminum or copper, and the coil is water cooled.

19. The primary part as claimed in claim 17, wherein the conductor is manufactured from a superconductor, preferably a high-temperature superconductor.

20. A linear motor with a secondary part and with a primary part, which is provided with a plurality of coils for inducing a magnetic field transmitting force along an axis between the primary part and the secondary part and with teeth, which are arranged between adjacent coils and have an end section facing the axis and a base section remote from the axis, the teeth on the end section being wider than on the base section, wherein the coils extend in the interspace between the base sections and in the interspace between the end sections, which are wider than the base sections of adjacent teeth, so as to increase the magnetic flux density, wherein the teeth have a multi part design, and wherein a tooth part forms the base section and a subsection of the end section and, in order to widen the end section, a ring is arranged laterally on the tooth part.

21. A primary part of a linear motor for moving a secondary part relative to the primary part, with a plurality of coils for inducing a magnetic field transmitting force along an axis between the primary part and the secondary part and with teeth, which are made from a magnetizable material, are arranged between adjacent coils and have a base section remote from the axis and an end section facing the axis, the teeth on the end section being wider than on the base section, wherein the coils extend in the interspace between the end sections of adjacent teeth so as to increase the magnetic flux density, the primary part comprising a step with which the base section merges into the end section at one of the two tooth sides facing the coils, and wherein the other tooth side is planar.

22. A primary part of a linear motor for moving a secondary part relative to the primary part, comprising:

a plurality of coils being concentrically arranged with respect to an axis for inducing a magnetic field transmitting force with the coils along the axis between the primary part and the secondary part; and teeth made from a magnetizable material, the teeth being arranged between adjacent coils and having a base section remote from the axis and an end section facing the axis, the teeth on the end section being wider than on the base section, wherein the base sections merges with a step into the end section at one of the two tooth sides facing the coils;

wherein the coils extend in the interspace between the base sections and in the interspace between the end sections of adjacent teeth for increasing the magnetic flux density.

23. The primary part as claimed in claim 22, wherein the width of the teeth in the base section is constant or substantially constant and/or that the other tooth side, facing remote from the step, is planar.

24. The primary part as claimed in claim 22, wherein the end section takes up half the tooth height in the radial direction.

25. The primary part as claimed in claim 22, wherein sections of opposite tooth sides of a tooth in the end section and/or in the base section are planar and extend parallel to one another.

26. The primary part as claimed in claim 22, wherein the teeth have a multi-part design, wherein a tooth part forms the base section and a subsection of the end section and, in order to widen the end section, a ring is arranged laterally on the tooth part.

27. The primary part as claimed in claim 26, wherein the tooth part and the ring part have a constant width or that the ring tapers towards the ring circumference or is configured so as to be conically beveled.

28. The primary part as claimed in claim 22, comprising a receptacle formed along the axis by the coils and/or the teeth for the secondary part and/or that the coils are manufactured in the form of rings and preferably in the form of pancake coils.

29. The primary part as claimed in claim 22, wherein at least two coils or a coil stack are arranged between adjacent teeth.

30. The primary part as claimed in claim 22, wherein the coils bear against the teeth and substantially fill interspaces between adjacent teeth.

31. The primary part as claimed in claim 22, wherein the end sections of the teeth extend in the radial direction with respect to the axis beyond an inner turn of the coils.

32. The primary part as claimed in claim 22, wherein a first coil bears laterally against the base section, and a second coil bears laterally against the first coil and laterally against the end section.

33. The primary part as claimed in claim 22, wherein individual coils or coil stacks which are matched to the gap geometry are arranged between adjacent teeth.

34. The primary part as claimed in claim 22, wherein the teeth and/or a yoke, which forms a magnetic return path, have a soft-magnetic material which includes a CoFe alloy and/or is in the form of a powder sintering material.

35. The primary part as claimed in claim 22, wherein the coils have at least one winding which is wound from a conductor and which can be operated with a current density of more than 10 A/mm$^2$, wherein the conductor is manufactured from aluminum or copper, and wherein the coil is water-cooled or is manufactured from a high-temperature superconductor.

36. A linear motor with a secondary part and with a primary part including a plurality of coils for inducing a magnetic field transmitting force along an axis between the primary part and the secondary part and with teeth arranged between adjacent coils and having an end section facing the axis and a base section remote from the axis, the teeth on the end section being wider than on the base section, wherein the coils extend in the interspace between the base sections and in the interspace between the end sections, which are wider than the base sections of adjacent teeth, to increase the magnetic flux density, and wherein the primary part is as in claim 22.

* * * * *